3,290,674
ELECTRONIC STORAGE FOR ATRAN
Thomas G. Calhoon, Bethesda, Md., assignor to the United States of America as represented by the Secretary of the Navy
Filed Mar. 27, 1959, Ser. No. 802,585
6 Claims. (Cl. 343—5)

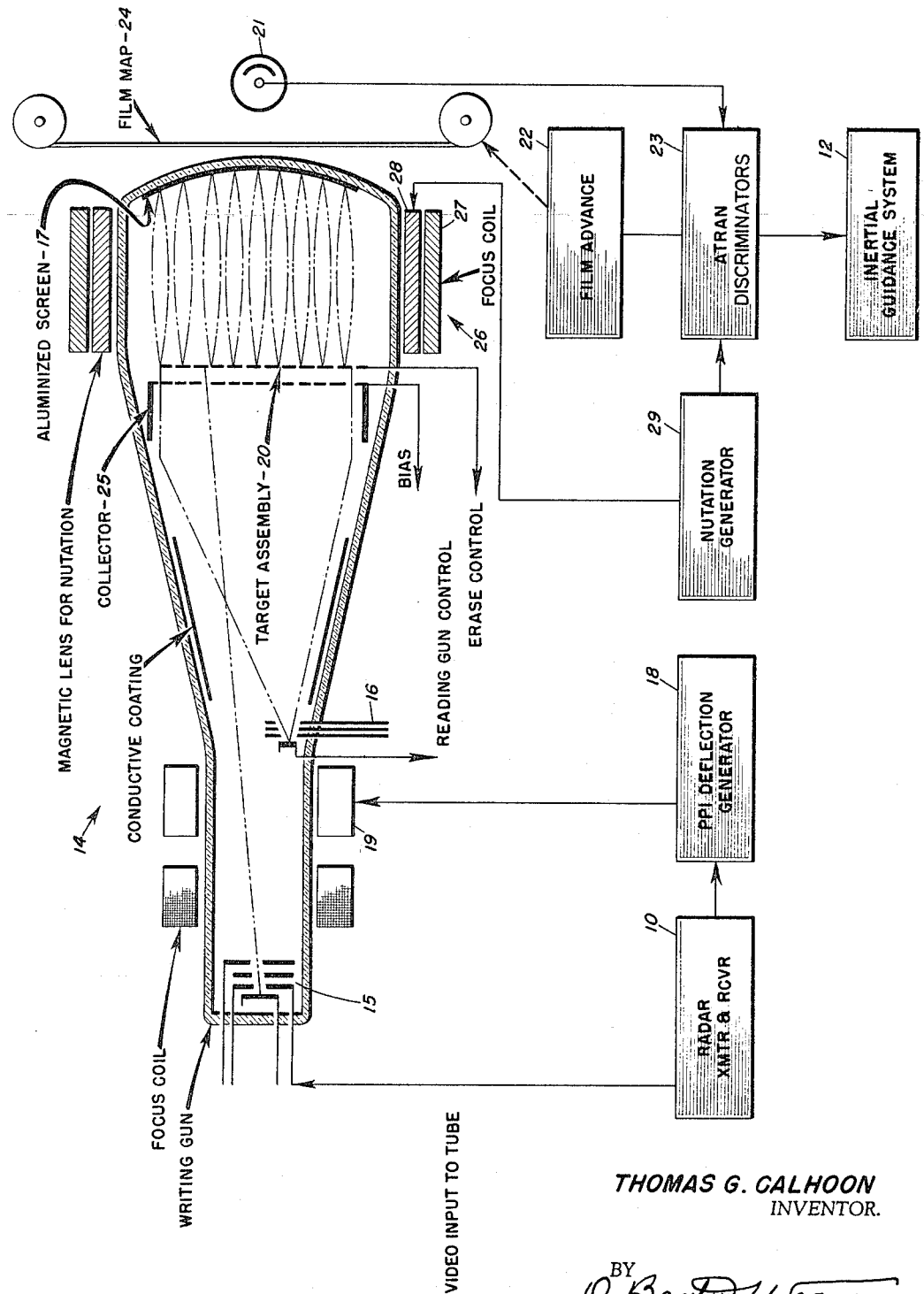

The present invention relates to navigation systems. More particularly, it relates to an inertial navigation system combined with means for providing terrestrial fixes obtained by an intermittently operated radar.

In the Automatic Terrain Recognition (ATRAN) system of aerial guidance for long-range missiles, the terrain beneath the missile is compared with a transparent radar map. The amount of relative movement between the map and image necessary to obtain register of map and image is an indication of the error in the missile's position.

It has been determined that it is unnecessary to survey the terrain continuously in ATRAN systems combined with inertial methods of guidance, as a periodic position check is adequate. A conversion of the continuous tracking type ATRAN guidance system to an intermittently operated device requires the addition of means for storing the radar information. The system is thereby enabled later to assemble the radar information and to determine the position of the missile.

In accordance with the present invention, an electrostatic storage tube is employed which possesses the reading and writing functions of prior storage tubes described in various technical journals, for example, Electrical Engineering, September 1956, p. 871. The tube of the present invention differs, however, in that there is included an additional magnetic lens which provides nutation of the displayed radar return signals.

The advantages of the invention reside in the substitution of a static map matching operation for the dynamic operation formerly performed an in the substitution of electronic nutation for mechanical nutation.

One object of this invention is therefore to provide a modified form of ATRAN guidance system in which nutation of the radar information is accomplished electronically thereby freeing the system from vibration and acceleration problems encountered in mechanical nutation arrangements.

Another object of the present invention is to provide a guidance system having increased security due to reduced requirements of transmission time.

An additional object is to provide a map-matching apparatus which stores the return obtained during a single transmission interval in order to reduce dynamic response requirements.

Other objects and many of the attendant advantages of this invention will be readily appreciated as the same becomes better understood by reference to the following detailed description when considered in connection with the accompanying drawings.

The single figure of the drawing is a block diagram of the present invention, the modified electrostatic storage tube thereof being shown schematically.

It should be understood that the entire apparatus of the drawing is carried aboard a missile (not shown) and that the objective of the missile is to reach a designated target by proceeding along a predetermined course. Most probably the target will lie within hostile territory necessitating caution to prevent early detection of the missile and its interception or jamming. Obviously, security is greatly increased if transmission is made only briefly and during widely separated intervals. Such operation is obtained when the missile is placed under the continuous control of an inertial guidance system. The inertial system may, if desired, program the period of radar transmission to occur in the vicinity of selected landmarks and then be caused to correct itself in accordance with the errors indicated by the ATRAN system. It is beyond the scope of the present invention to enter into the details of the inertial guidance system. It can be stated, however, that such systems have reached a state of development wherein errors arising from the drift rates of their components are at least within the limits of the uncertainties of the target coordinates.

When the missile course is periodically checked against landmarks or the normal ground return characteristic of selected areas, sufficient information is obtained to correct the course to the desired position. Thus the missile may be safely navigated to a target even when the target coordinates are subject to considerable doubt and when the inertial system drifts more than the amount tolerable for navigation by inertial means alone.

Referring to the drawing, the navigation system of the present invention includes a radar 10 which operates either on a programmed time schedule or in response to a command from the inertial guidance system 12. The radar may employ side-looking antennas and rely upon missile motion to provide a raster-like scan or, alternatively, a sector of the terrain may be scanned as in conventional radars. The latter arrangement is presumed herein.

During the radar transmission period, the reflected impulses, or video return signals are stored in the modified electrostatic storage tube 14 previously mentioned. The tube 14 includes a pair of electron guns together with accelerating electrodes and focusing means. One of the guns 15, is designated the writing gun and is operated at a considerably higher energy level than the second gun 16. The second gun 16 is the reading flood gun which functions to reproduce visually the image first inserted by the writing gun 15. The video impulses received by the radar 10 are applied either to the cathode or control grid of writing gun 15 to modulate its electron beam output. The beam from gun 15 is deflected, as in the usual radar display tubes, by a PPI deflection generator 18 and yoke assembly 19 to store on the target assembly 20 an image of the terrestrial reflectors.

At the termination of radar transmission, the reading flood gun 16 is actuated for presenting a luminous image on the aluminized phosphor screen 17 of tube 14. The ATRAN apparatus is then actuated to determine the point of best match between the visible image of the viewing screen and the film map 24. The ATRAN apparatus is similar to the "Radar Map Matching System," disclosed at page 444ff. of "Guided Missile Fundamentals," U.S.A.F. Manual 52–31, G.P.O. 1957. It includes the usual phototube detector 21, lateral and longitudinal discriminators 23 and film advance mechanism 22. If the missile position is in error, the necessary corrections enter the inertial guidance system 12 from the ATRAN discriminators 23.

The writing and reading guns 15 and 16 are typical cathode ray tube guns. The writing gun 15 generates a comparatively high velocity electron beam which strikes the fine insulating mesh of the target assembly 20 with sufficient energy to cause secondary emission of electrons. The electrons thus emitted are removed by a positively biased collector assembly 25, leaving the target 20 with areas positively charged in proportion to the amplitude of the video signal applied to gun 15. The target assembly 20 is nevertheless negative with respect to the cathode of gun 16 due to the lower initial difference in potential between the two. Thus, the storage of a pattern on the target creates local electrostatic fields around the holes of the target mesh which control the amount of current from gun 16 passing therethrough. Those electrons penetrating the target 20 are accelerated toward the viewing screen 17 by a high voltage field applied to the back of the phosphor surface. The pattern of charges stored by the writing gun is thus maintained in a visible state for times limited principally by the number of ions in the tube and may extend for about 60 seconds.

To accomplish the map-matching function of the ATRAN apparatus it is necessary to provide means for determining the direction of error. That is, the phototube detector 21 provides an indication solely of the amount of light transmitted by the film map. As a simple example, assume that the film map 24 is a negative transparency of the radar return from the terrain beneath the missile. It may be assumed that if the missile position were correct a minimum amount of light would pass through the transparency and a minimum output would be obtained from detector 21. But if the missile were off course in a position that would require the map to be shifted to the right for match, detector 21, acting alone, would only reveal the presence of an error without indicating that a shift to the right is necessary for correction. In the prior ATRAN system, directional sense was introduced by nutating the film carriage and applying the output of detector 21 to discriminators 23 which are synchronized with the nutation generator. Thus, detector output would be reduced as the map moved toward the position of best match and increased as the map moved away from the position of best match. The output from the discriminator was then applied either to shift the mean position of the carriage towards a match condition or to alter the centering of the display tube image toward a match condition.

The present invention eliminates mechanical means of nutation by the provision of a magnetic lens 26 which includes a focus coil 27 and a deflection coil 28. The electrons passing from target assembly 20 to the phosphor screen are converged into sharp beams by the focus coil 27 and deflected circularly by the coil 28 driven by a suitable nutation generator 29. The image produced by the viewing screen then possesses a circular motion which provides effects identical with a mechanical nutation of the film carrier.

Upon securing a match condition the error indicated in the missile position is utilized to reset the inertial guidance system to the proper course. The error may be represented by an analogue voltage or digitally through the use of analogue to digital converters. At the completion of a position fix, the target assembly 20 is erased in preparation for the next image to be stored thereon. Erasure is accomplished by raising the potential of the target assembly above the cathode potential of gun 16. Electrons will then flood the surface of the target 20 neutralizing the charged areas previously stored by writing gun 15 and present a uniform potential surface for the reception of a new image.

The match condition may be achieved more rapidly and with greater accuracy in the present system than in the prior system because of two factors. First, nutation of the image can occur at much higher rates than formerly since the rate is no longer limited by the difficulties of driving mechanical linkages at high cyclical speeds. And second, the map matching operation has now been reduced to what may be called static conditions. In the prior system, the radar image continuously underwent a change due to the motion of the missile thus requiring continuous motion of the map also to maintain near match conditions. Perfect match could never be achieved although errors could be reduced by increasing the response speed of the apparatus. It is now evident that a map may be matched to a fixed image and tolerances may then be generally relaxed without sacrifice of performance.

Obviously, many modifications and variations of the present invention are possible in the light of the above teachings. It is therefore to be understood that within the scope of the appended claims, the invention may be practiced otherwise than as specifically described.

What is claimed is:

1. An aerial navigation system for a long range missile, comprising an inertial guidance system for maintaining a predetermined course, a radar for obtaining at intervals a representation of the terrain beneath the missile, an electrostatic storage tube for storing the output of said radar and for converting the same into a luminous image having a comparatively long duration, means for supplying a motion of nutation to said visible image, a transparent map superimposed upon said image, said map containing representations of the radar return from the terrain as it would appear to a missile properly positioned on course, means for detecting the amount of light transmitted by said map, and means responsive to said light detecting means for shifting said map into registry with said luminous image whereby errors in the position of said missile can be determined.

2. Apparatus as claimed in claim 1, wherein said storage tube includes an evacuated envelope, a storage target within said envelope, and a phosphor screen spaced from said target.

3. Apparatus as claimed in claim 2, wherein said means for supplying a motion of nutation comprises a magnetic lens having its structural elements adjacent said envelope and creating a magnetic field within said envelope for deflecting electrons travelling from said target to said phosphor screen.

4. An aerial navigation system for a long range missile, comprising, an inertial guidance system for maintaining a predetermined course, a radar for obtaining at intervals a representation of the terrain beneath the missile, a storage tube including a storage target upon which said radar representation is stored, a phosphor screen spaced from said storage target, means for irradiating said storage target to present on said phosphor screen a luminous image of said stored representation, and a magnetic lens interposed between said storage target and said phosphor screen, means coupled to said magnetic lens for causing a nutating motion to the field thereof and consequent nutation of said luminous image, a transparent map superimposed upon said image, said map containing representations of the radar return from the terrain as it would appear to a missile properly positioned on course, means for detecting the amount of light transmitted by said map, and means responsive to said light detecting means for shifting said map into registry with said luminous image whereby errors in the position of said missile can be determined.

5. A navigation system for a long range guided missile, comprising, the combination of an inertial guidance means with automatic terrain recognition apparatus, said apparatus having a radar adapted to transmit at selected intervals and to receive the return from the terrain beneath the missile, an electrostatic storage tube receiving the return obtained by said radar, said storage tube including an evacuated envelope having a phosphor surface at one end thereof for producing a visible image of said return, a pair of electron guns in said envelop, a storage target in said envelope interposed between said guns and said phosphor surface, one of said guns being controlled by signals from said radar so as to store a pattern of charges on said target corresponding to said return, the other of said guns providing a broad stream of electrons for irradiating said target, electrons from said broad stream passing through said target in the vicinity of said stored charges and being elsewhere repelled so that a visible image of the radar return is produced at said phosphor surface, means for deflecting electrons traversing the space between said target and said phosphor surface, and means for matching said image with a previously prepared map whereby errors in said inertial means may be determined.

6. Apparatus as claimed in claim 5 with additionally a nutation generator coupled to said deflection means to provide a nutating image at said phosphor surface.

References Cited by the Examiner

UNITED STATES PATENTS

| | | | |
|---|---|---|---|
| 2,753,552 | 7/1956 | Hom | 343—7 |
| 2,787,188 | 4/1957 | Berger | 343—7 |

OTHER REFERENCES

"Guided Missile Fundamentals," AF Manual 52-31 (1957), pp. 428–446.

CHESTER L. JUSTUS, *Primary Examiner.*

FREDERICK M. STRADER, *Examiner.*

M. A. MORRISON, R. D. BENNETT,
*Assistant Examiners.*